No. 815,748. PATENTED MAR. 20, 1906.
O. G. C. SCHMITT.
ELECTROMAGNETIC DEVICE FOR DISTRIBUTING MACHINES.
APPLICATION FILED MAY 20, 1904.

6 SHEETS—SHEET 1.

Witnesses:
Franz Reinhold
Lillie M. Perry

Inventor:
Otto G. C. Schmitt
by Briesen & Knauth
his Attorneys.

No. 815,748. PATENTED MAR. 20, 1906.
O. G. C. SCHMITT.
ELECTROMAGNETIC DEVICE FOR DISTRIBUTING MACHINES.
APPLICATION FILED MAY 20, 1904.

6 SHEETS—SHEET 2.

Witnesses:
Franz Reinhold.
Lillie M. Perry.

Inventor;
Otto G. C. Schmitt
by Briesen & Knauth
his Attorneys.

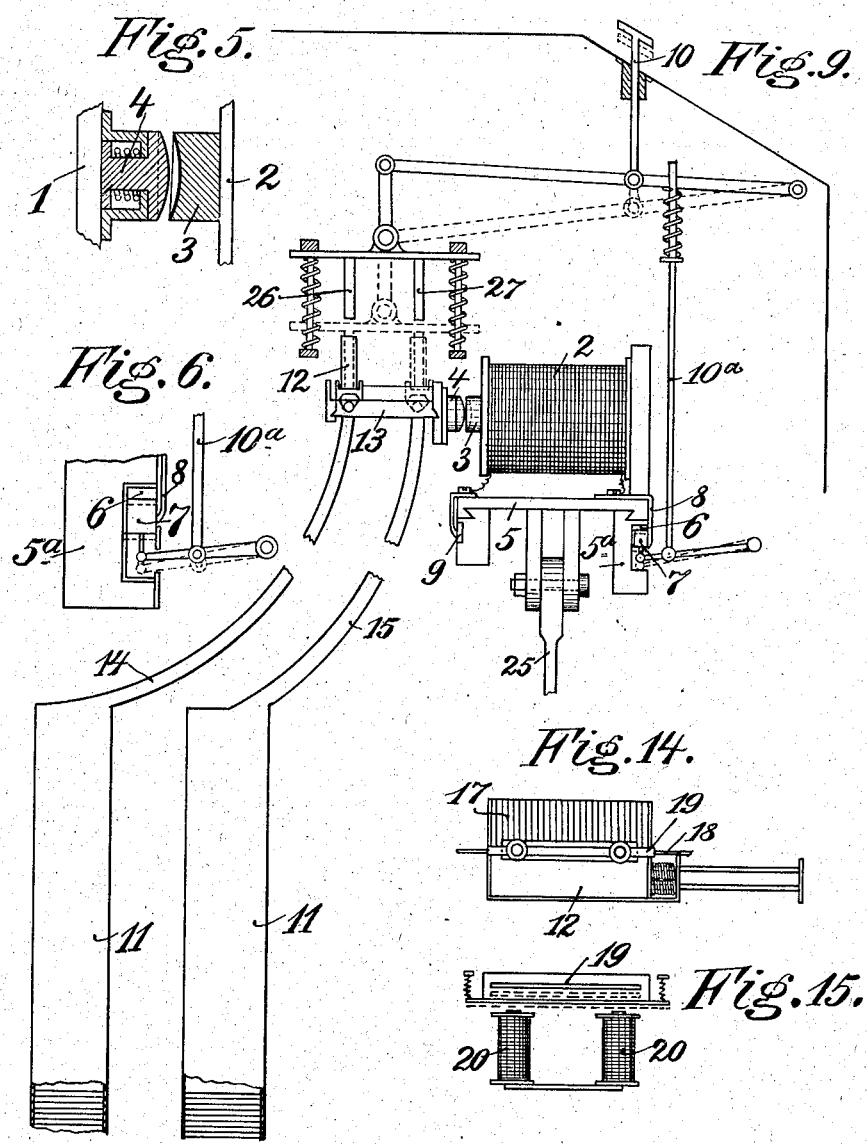

No. 815,748. PATENTED MAR. 20, 1906.
O. G. C. SCHMITT.
ELECTROMAGNETIC DEVICE FOR DISTRIBUTING MACHINES.
APPLICATION FILED MAY 20, 1904.

6 SHEETS—SHEET 4.

Witnesses:
Franz Reinhold.
Lillie M. Perry.

Inventor:
Otto G. C. Schmitt.
by Briesen & Knauth
his Attorneys.

No. 815,748. PATENTED MAR. 20, 1906.
O. G. C. SCHMITT.
ELECTROMAGNETIC DEVICE FOR DISTRIBUTING MACHINES.
APPLICATION FILED MAY 20, 1904.

6 SHEETS—SHEET 5.

Witnesses:
Franz Reinhold.
Lillie M. Perry.

Inventor:
Otto G. C. Schmitt
by Briesen & Knauth
his Attorneys.

No. 815,748. PATENTED MAR. 20, 1906.
O. G. C. SCHMITT.
ELECTROMAGNETIC DEVICE FOR DISTRIBUTING MACHINES.
APPLICATION FILED MAY 20, 1904.
6 SHEETS—SHEET 6.
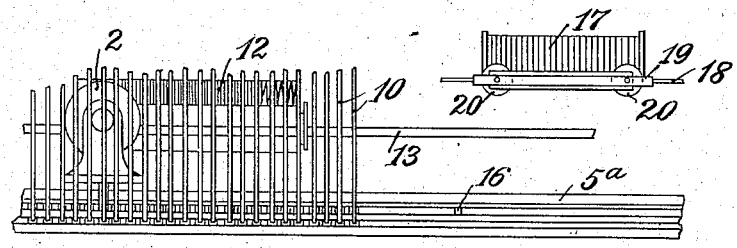
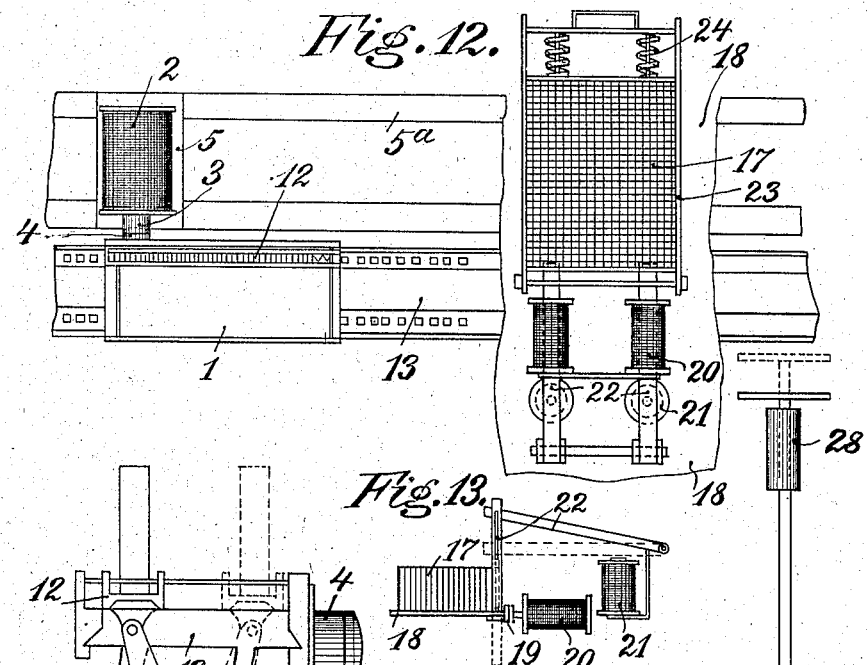
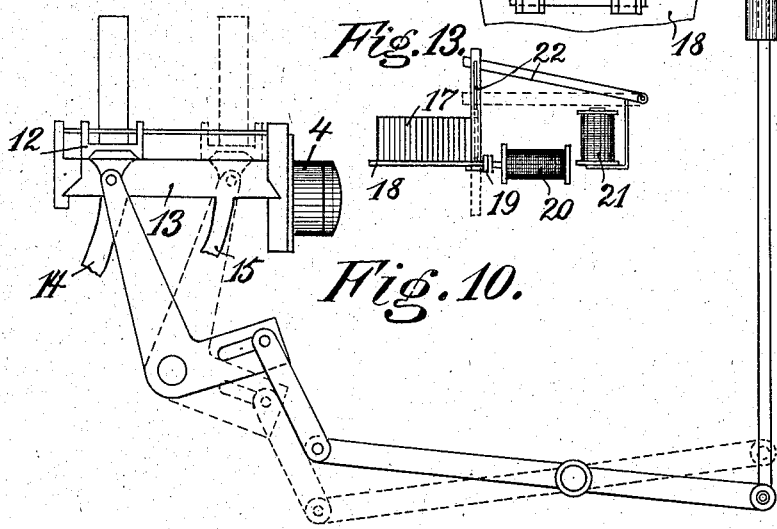
Witnesses:
Franz Reinhold
Lillie M. Perry.
Inventor:
Otto G. C. Schmitt
by Briesen & Knauth
his Attorneys.

UNITED STATES PATENT OFFICE.

OTTO GEORG CHRISTIAN SCHMITT, OF FRANKFORT-ON-THE-MAIN, GERMANY, ASSIGNOR TO THE FIRM OF WAGNER & BRAND, OF FRANKFORT-ON-THE-MAIN, GERMANY.

ELECTROMAGNETIC DEVICE FOR DISTRIBUTING-MACHINES.

No. 815,748.     Specification of Letters Patent.     Patented March 20, 1906.

Application filed May 20, 1904. Serial No. 208,793.

*To all whom it may concern:*

Be it known that I, OTTO GEORG CHRISTIAN SCHMITT, residing at Frankfort-on-the-Main, Hohenzollernstrasse 4, in the Kingdom of Prussia, German Empire, have invented new and useful Improvements in Electromagnetic Devices for Distributing-Machines, of which the following is a specification.

This invention relates to an electromagnetic device which is particularly suitable for use in connection with mechanically-operated distributing-machines—such, for example, as type-distributing machines and the like.

The object of the invention is to effect the instantaneous stoppage at a determined spot of a distributing part (which is moved along by a continuously-reciprocating mechanical device) by means of an electromagnet which is normally energized and from which the current is suddenly cut off when the said spot is reached.

Figure 1:
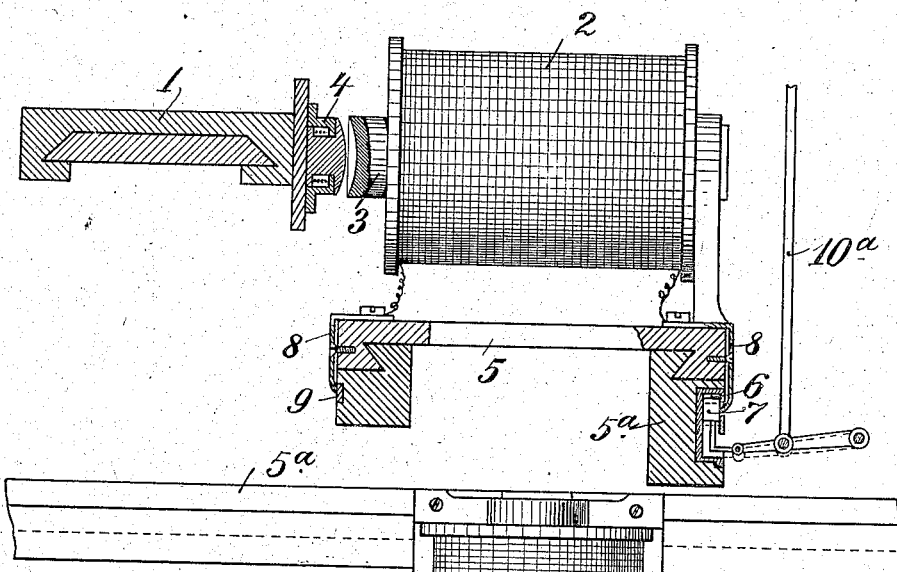
Figure 2:
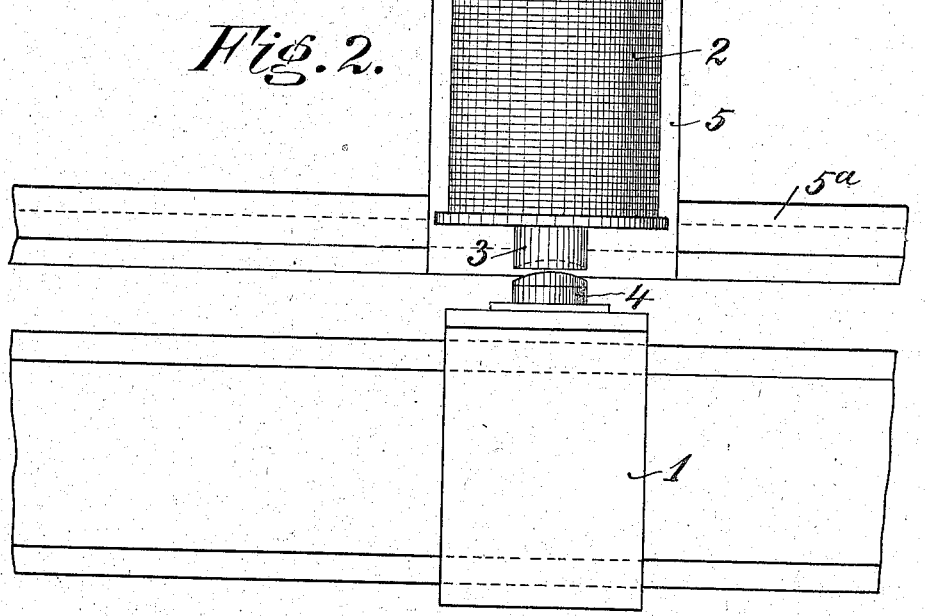
Figure 3:
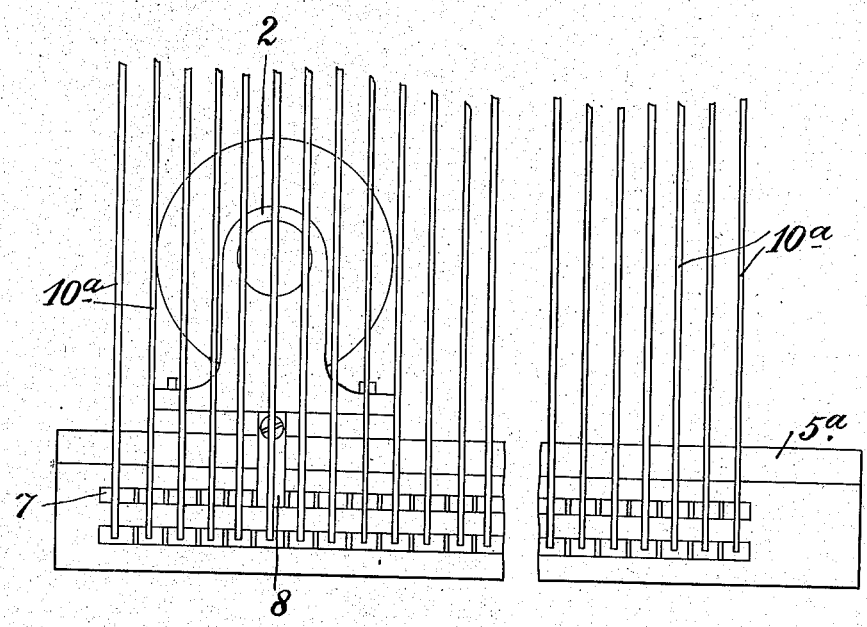
Figure 4:
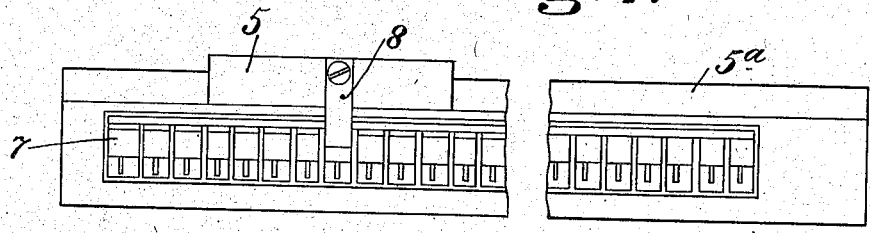

In the accompanying drawings, Figures 1, 2, and 3 illustrate the principle of the invention, Fig. 1 being a side elevation, Fig. 2 a plan, and Fig. 3 a rear elevation, of the same. Fig. 4 is a detail view from Fig. 3. Fig. 5 and Fig. 6 are detail views in a larger scale from Fig. 1. Figs. 7 to 15 illustrate the practical application of the invention and will be more particularly referred to hereinafter.

Referring first to Figs. 1 to 4, 1 represents a distributing part arranged so as to be capable of motion along a plane path. 2 is an electromagnet, likewise movable along a plane path and adapted to carry the part 1 along with it, the electromagnet being caused by mechanical means (such as a driving-shaft or the like) to travel to and fro continuously. When energized, the electromagnet 2 moves the part 1 by the attraction of its core 3, the part 1 being for this purpose provided with a spring-pressed armature 4, which is adapted to be normally attracted in opposition to the action of the spring by the core 3 of the electromagnet 2 when energized. Current may be supplied to the electromagnet from any suitable source. For this purpose a contact-bar 6, mounted on the slide 5ª of the electromagnet, is connected to one pole of the source of electricity (not shown) and is provided with contact-pieces 7, over which slides a current-collector 8, attached to the carriage 5 of the electromagnet 2. For the purpose of providing a return-path for the current to the source of electricity after flowing through the electromagnet the other end of the magnet-coil is electrically connected to a second bar 9, Fig. 1, which is electrically connected in turn to the other pole of the source of electricity. The contact-pieces 7 are mounted on levers 10, which are provided with keys, of which there are forty-five, arranged in three superposed rows like the keys of a type-writing machine.

The mode of operation of the above-described selection device is as follows: The electromagnet 2, together with its carriage 5, is moved to and fro continuously along its slide 5ª by a pivoted rocking lever or equivalent device and is normally maintained in electrical connection with the source of current through the medium of the contact-bars 6 and 9. In other words, the electromagnet is normally energized, and its core 3 holds the armature 4 of the distributing part 1 attracted, in opposition to the action of the armature-springs. The electromagnet 2 therefore normally moves the distributing part 1 along with it in its to-and-fro movement. If it be now desired to arrest the distributing part 1 at any determined point in the travel of the electromagnet, it is only necessary to strike that particular one of the keys 10 which corresponds to the said determined point. By means of the said key the corresponding contact 7 is moved away from the bar 6, and therefore the current flowing through the electromagnet 2 is cut off on the electromagnet arriving at this contact, so that the electromagnet being now deprived of current its core 3 will release the armature 4 of the distributing part 1 and the armature 4 will be caused by the action of its spring to move back into the position of rest. (Shown in full lines in Figs. 1 and 2.) Hence the distributing part remains stationary at the point corresponding to the key that was struck, while the electromagnet 2 continues its motion under the impulse of the mechanical device whereby it is driven.

Figure 7:
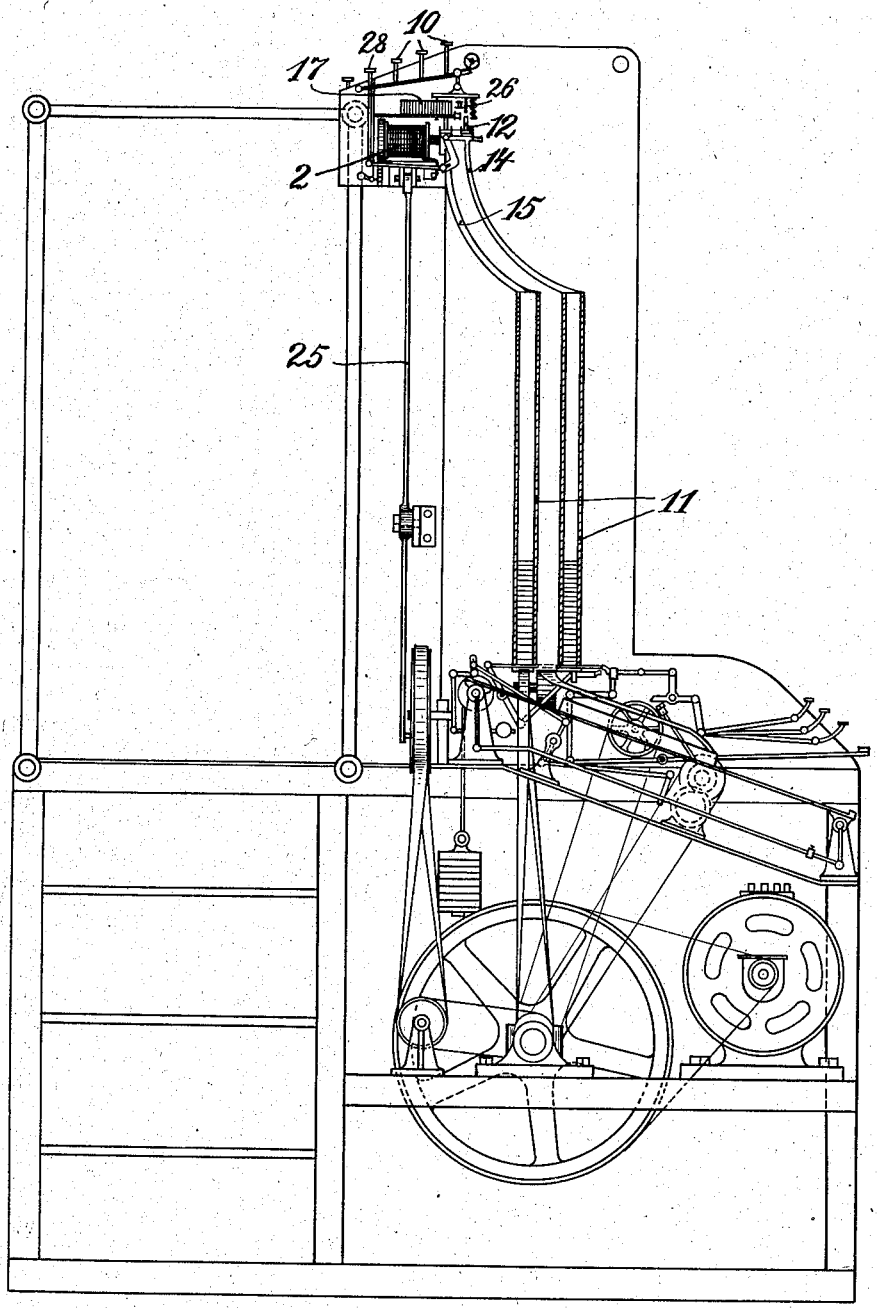
Figure 8:
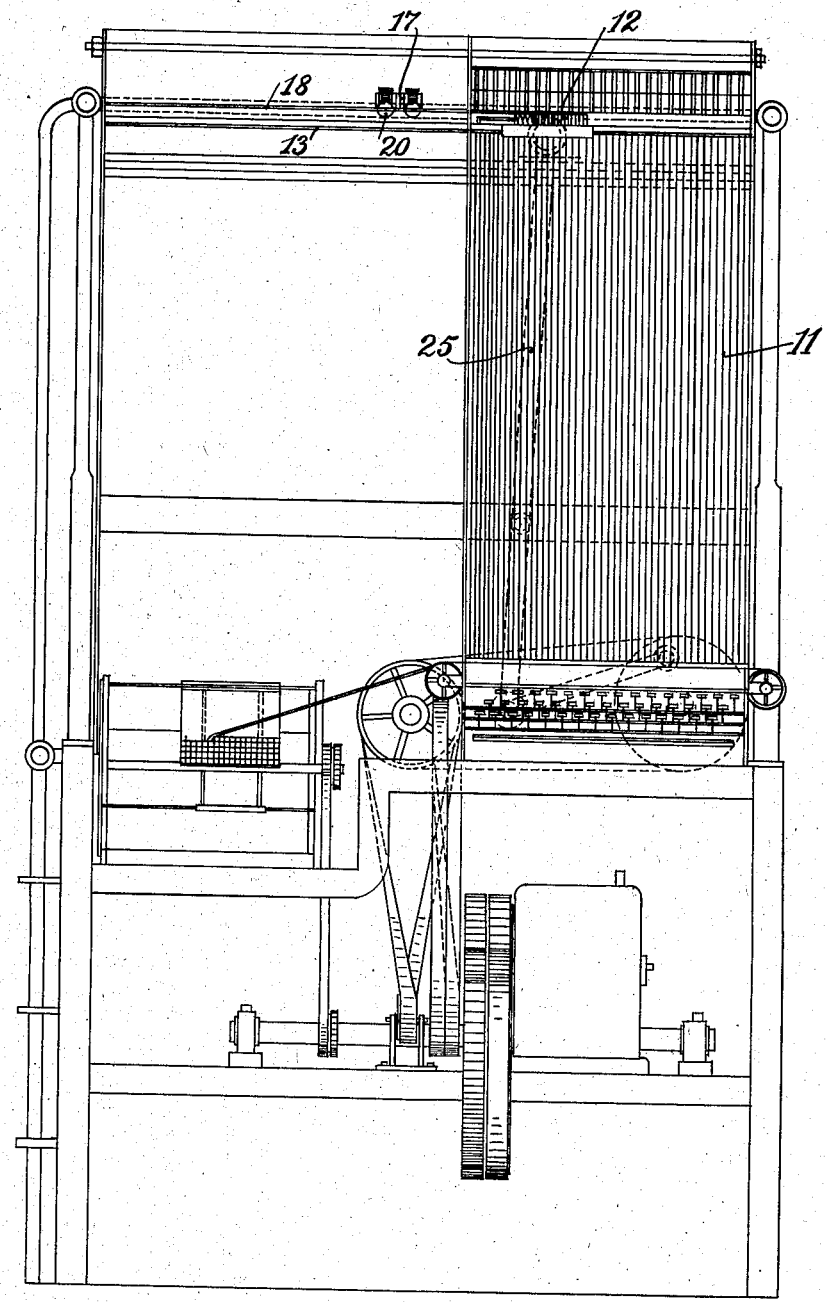

The above-described electromagnetic selection device may be generally employed in connection with machines for mechanically removing or distributing small objects. I shall now proceed to describe more particularly its employment in connection with a type-distributing machine. The object of this arrangement is to enable the distribution to be effected mechanically by providing an arrangement of keys (similar to the keyboard of a type-writing machine) for the type-distributing apparatus, the arrangement being such that on depressing a key corresponding to a particular letter of the alphabet the type-galley carrying the line of type to be distributed is mounted to slide upon a bar, along which it is carried by an electromagnet (through which current is flowing) that slides along another bar. The galley being suddenly released at the spot corresponding to the letter which it is desired to distribute, the type is conveyed, by means of a plunger, through a slot in the galley into the type-chute, which is situated underneath. This improved arrangement possesses, as compared with other machines of its kind, the advantages of great simplicity and certainty in working and of enabling the ordinary printing-types—i. e., types without variable nicks—to be safely distributed, as by this means the risk (which exists in other distributing-machines) of breaking the nicked types is entirely obviated. Such a type-distributing machine is illustrated in Figs. 7 to 15, wherein Fig. 7 is a side elevation showing the general arrangement of the machine. Fig. 8 is a front view of Fig. 7. Fig. 9 is a side elevation of the type-distributing apparatus. Fig. 10 shows the device for reversing the motion of the type-galley. Fig. 11 is a front elevation of the type-distributing device. Fig. 12 shows the distributing device in plan, partly broken away. Figs. 13, 14, and 15 show the electromagnetic device for charging the type-galley with a line of type which it is desired to distribute.

For the purpose of mechanically distributing the type after use there is provided above the type-chutes 11 a type-galley 12, Figs. 9, 10, 11, and 12, adapted to receive a line of type and mounted so as to be capable of horizontal movement along a slideway 13 above the passages 14 15, leading to the respective type-chutes 11. This type-galley 12 is connected to the electromagnetic selecting device which forms the subject of this invention.

In the set of keys for the distributing apparatus forty-five keys are provided for the forty-five chutes. All the type of one character are fed into the same chute, there being a separate chute for each of the various characters. A forty-sixth key has for its object to convey into a collecting-passage any types (in the line to be distributed) for which no special type-chutes are provided, while the forty-seventh, forty-eighth, and forty-ninth keys are provided for the purpose of establishing electrical contacts, whereby to effect the actuation of the charging device for the type-galley 12 by means of electromagnetically-operated devices, Figs. 13, 14.

The charging of the galley is effected as follows: By pressing upon the forty-sixth key the electric circuit in the slide-bar 5ª, carrying the electromagnet 2, Fig. 11, is interrupted at 16, upon reaching which point the type-galley 12 is suddenly released by the electromagnet 2 in the manner before described. Meanwhile the type-galley has been left exactly beneath the matter 17 contained in the locking-frame 23 and which is to be distributed (see Figs. 12 and 14) and which is brought by hand on a table 18, beneath which the type-galley is moved to and fro by the electromagnet 2. Exactly above the galley 12 there is provided in the bottom of the locking-frame a slot which is closed by means of a slide 19, Figs. 13, 14, 15. In order to open the slot, the forty-seventh key is depressed, while the forty-sixth key is also depressed at the same time, the effect being to close the circuit through the electromagnet 20, whereby the slide 19 is attracted, so as to open the slot in the locking-frame to an extent equal to the width of a line of type. Then by depressing the forty-eighth key the circuit is closed through an electromagnet 21, whereby a pusher 22 is attracted, so as to push the said line of type through the opening in the locking-frame into the type-galley 12, situated underneath. As soon as this is done the contact-making keys are released and the parts that were effected by them return to a position of rest. Compression-springs 24, Fig. 12, provided in the locking-frame 23, push the remaining lines of type forward to occupy the position which has become vacant.

The mode of operation of the above-described type-distributing apparatus is as follows: For the purpose of distributing the type from the type-galley 12 (which is charged as above stated and is carried along by the electromagnet 2, the latter being continually moved to and fro by means of a lever 25, Figs. 7, 8, 9, or any other suitable device actuated from the main driving-shaft of the machine) it is necessary to depress the key 10 that corresponds to the letter which is to be distributed. By so doing there is produced, by means of the corresponding contact-lever 10, Figs. 1, 6, 9, an interruption of the current flowing through the electromagnet, and consequently the type-galley is released and stopped directly over the type-chute corresponding to that letter—that is to say, over the passage 14 or 15, leading to the required type-chute—and by further depressing the corresponding key 10 the type-letter is pushed by the pusher 26 or 27, Fig. 9, out of the type-galley into the corresponding passage 14 or 15.

The distributing apparatus is also provided, as shown in Fig. 10, with a shift-key 28, which is common to all the keys 10 for the purpose of enabling the type-galley to be brought according to requirement over the passages 14 for the letters of the small alphabet or, as indicated in dotted lines in Fig. 10, over the passages 15 for the capitals or letters of the large alphabet, it being understood that a separate chute is provided for each of the various characters and that all the type of one character are collected in one particular chute.

What I claim as new and of my invention, and desire to secure by Letters Patent, is—

1. An electromagnetic selection device for use in mechanically-operated distributing apparatus consisting of an electromagnet which is continuously caused by mechanical means to move to and fro upon a slide, and a distributing part which is likewise movable to and fro along a slide, and is provided with a spring-pressed armature, being attracted or suddenly released by the core of the electromagnet when this latter is energized or the magnetizing-current is interrupted.

2. In the electromagnetic selection device for use in mechanically-operated distributing apparatus, the combination with the electromagnet movable to and fro upon a slide, and the distributing part which is likewise movable to and fro along a slide, of movable contact-pieces placed at intervals along the path of the electromagnet, a current-collector fixed to the electromagnet-carriage and adapted to make sliding contact with said contact-pieces and keys connected to the respective contact-pieces.

3. In the electromagnetic selection device for use in mechanically-operated distributing apparatus, the combination with the electromagnet movable to and fro upon a slide, and the distributing part which is likewise movable to and fro along a slide, of a galley containing the matter to be distributed and having mounted on it the armature of the electromagnet.

4. In the electromagnetic selection device for use in mechanically-operated distributing apparatus, the combination with the electromagnet movable to and fro upon a slide, a distributing part which is likewise movable to and fro along a slide, and a galley for containing a line of type to be distributed, of key-controlled electromagnetically-operated devices for effecting the transfer of a line of type to the galley, said devices comprising a slide which normally closes a delivery-aperture in the locking-frame containing the matter to be distributed and is adapted to be opened by the action of an electromagnet, and of a pusher adapted to be operated by another electromagnet so as to cause the line of type to be distributed to pass through said aperture into the galley.

5. In the electromagnetic selection device for use in mechanically-operated distributing apparatus, the combination with the electromagnet movable to and fro upon a slide, a distributing part which is likewise movable to and fro along a slide, with a set of keys adapted to effect the delivery of individual types from the distributing-galley to the respective type-chutes comprised in a range appropriated to one alphabet, of a shift-key common to all the keys of the set and adapted to cause the actuation of said keys to effect the delivery of types to the respective type-chutes comprised in a range appropriated to another alphabet.

In testimony whereof I have signed my name to this specification in the presence of two subscribing witnesses.

OTTO GEORG CHRISTIAN SCHMITT.

Witnesses:
KARL MERZ,
JEAN GRUND.